(12) United States Patent
Roesler

(10) Patent No.: US 9,950,420 B2
(45) Date of Patent: Apr. 24, 2018

(54) ELASTIC PROTECTIVE CAP TO BE PLACED OVER A POLYGONAL TOOL SHANK

(71) Applicant: Thiemo Roesler, Wangen (DE)

(72) Inventor: Thiemo Roesler, Wangen (DE)

(73) Assignee: Rose Plastic AG (DE)

(\*) Notice: Subject to any disclaimer, the term of this patent is extended or adjusted under 35 U.S.C. 154(b) by 309 days.

(21) Appl. No.: 14/847,158

(22) Filed: Sep. 8, 2015

(65) Prior Publication Data
US 2016/0067861 A1    Mar. 10, 2016

(30) Foreign Application Priority Data
Sep. 8, 2014  (DE) .................. 10 2014 012 976

(51) Int. Cl.
*B65D 43/08* (2006.01)
*B25H 3/00* (2006.01)
*B23B 51/00* (2006.01)

(52) U.S. Cl.
CPC ............. *B25H 3/003* (2013.01); *B23B 51/00* (2013.01); *B25H 3/006* (2013.01); *B23B 2231/0244* (2013.01); *B23B 2260/112* (2013.01)

(58) Field of Classification Search
CPC .. B25H 3/003; B25H 3/006; B23B 2231/0244
USPC ......................................... 220/793
See application file for complete search history.

(56) References Cited

U.S. PATENT DOCUMENTS 2,866,188 A * 12/1958 Messner ................ H04N 5/645
                                                                 348/818
5,906,463 A *  5/1999 Damm .................. F16B 43/001
                                                                 411/369

FOREIGN PATENT DOCUMENTS

| DE | 3850450     | 4/1988  |
| DE | 102005022385 | 11/2006 |
| DE | 102009012133 | 12/2009 |

\* cited by examiner

*Primary Examiner* — Andrew T Kirsch
*Assistant Examiner* — Don M Anderson
(74) *Attorney, Agent, or Firm* — Cohen & Grigsby, P.C.

(57) ABSTRACT

Protective cap to be placed over a political tool shank that consists of an at least partly ring-shaped casing, on which, in the vicinity of a base part, a terminating ring with a ring-shaped insertion-guide profile is shaped, wherein the casing and the terminating ring together form a receptacle space for the tool shank, wherein in the direction in which the protective cap is pushed onto the tool shank, the base-side annular area transitions into a cover-side trochoidal area which is adapted to the polygonal shape of the tool shank.

9 Claims, 10 Drawing Sheets

ELASTIC PROTECTIVE CAP TO BE PLACED OVER A POLYGONAL TOOL SHANK

Figure 1:
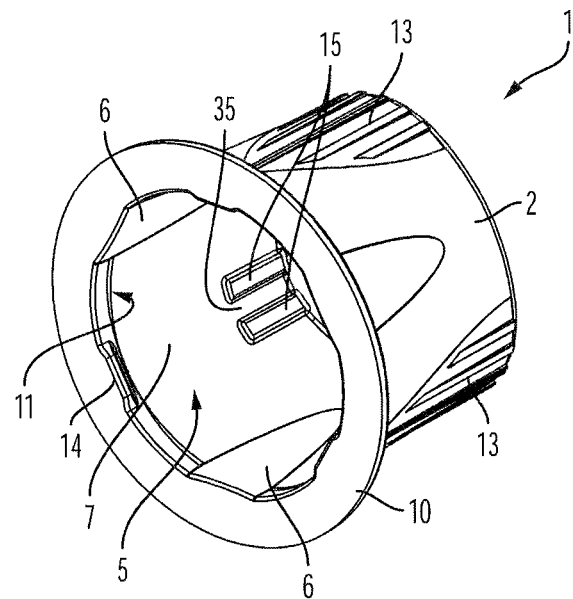

This invention relates to an elastic protective cap to be placed over a polygonal tool shank as further described herein.

Tool shanks are known, for example, from their use in the precision turning and milling sectors. Some shanks of this type have grooves by which an improved transmission of force is achieved. Protection of the valuable and precision-manufactured tool shanks against damage is thereby essential.

A tool shank with a polygonal profile is sold, for example, under the trade name "capto". This specially designed shank is preferably protected against damage by an elastic protective cap. The shape of the shank corresponds to a trochoid. The protective cap is made of an elastically expandable plastic and corresponds essentially to an annular sleeve. In other words, the profile shape of the base cross section is annular and transitions by means of associated annular connecting surfaces into a likewise ring-shaped cover surface Therefore the invention relates to a rotationally symmetrical elastic protective cap that is designed to be placed over a known polygonal tool shank.

This polygonal tool shank, which in profile has the shape of a trochoid, has the additional characteristic that it tapers conically toward its tip, i.e. it has conical lateral surfaces that make it extremely difficult to place a protective ring-shaped sleeve on this polygonal tool shank.

The conically beveled lateral surfaces also allow the annular sleeve of the prior art to slide off upward. To secure it against an unintentional axial displacement, the annular sleeve of the prior art has, on the inside of the annular lateral surface, in the vicinity of the cover surface, clamping surfaces that point radially inward and are in contact with and exert a clamping action on the transitional surfaces between the trochoidal surfaces of the polygonal tool shank, whereupon the annular surface of the elastic protective cap is slightly spread open.

With the annular cap of the prior art, therefore, the result is only a press fit on the conical polygonal took shank, which results in a poorly secured position.

The trochoidal shape of the tool shank is basically triangular. For this reason, the above mentioned clamping surfaces are located on the inside of the protective cap of the prior art, as well as at a peripheral angle of 120 degrees, and are intended to correspond to the associated transitional surfaces which have smaller radii of curvature and are located in particular between the trochoidal surfaces that have larger radii of curvature.

However, placement of the elastic protective cap of the prior art in the proper position to protect the polygonal tool shank is difficult to achieve.

It must be ensured by repeated placements and rotations of the elastic protective cap of the prior art that the three clamping surfaces located on the periphery and pointing radially inward are also actually in contact with the transitional areas between the flatter trochoidal surfaces and form a press fit there.

If this press fit is not achieved and the elastic protective cap is unintentionally rotated by an angle of 30 degrees, for example, the press fit is lost and the elastic protective cap can unintentionally fall off the tool shank. There is no locking connection nor any protection against axial displacement.

For this reason, the object of the invention is to develop an elastic protective cap to be placed over a polygonal tool shank of the type described above so that as soon as the cap is placed over the tool shank there is an automatic rotational orientation of the protective cap to the trochoidal shape of the polygonal tool shank, and that as the cap is slid further onto the shank, the elastic protective cap Is automatically rotated into the final position and is automatically oriented with respect to the polygonal tool shank.

In one development of the invention, there is also a locking between the elastic protective cap and the tool shank to secure the protective cap against slipping off the polygonal tool shank.

This object is accomplished by the technical teaching disclosed in claim 1.

Accordingly, a significant feature of the invention is that the elastic protective cap departs from a ring shape, wherein starting from the base side of the protective cap, the profile is approximately ring-shaped, and over the adjacent transitional surfaces transitions into a cover side, the shape of which matches the trochoidal shape of the polygonal tool shank.

The essential advantage of the invention is that when the elastic protective cap is placed over the tool shank, the ring-shaped base side can be initially placed over it in any arbitrary rotational position, wherein during as the protective cap is pushed further over the tool shank the trochoidal shape of the polygonal tool shank can be brought into contact with associated centering surfaces or orientation surfaces in the interior receptacle space of the protective cap, which are then oriented to the support and centering surfaces located there, and thus as the protective cap is slipped on further, it is automatically brought into the necessary rotational position required to protect the tool shank and the position required for the related press fit.

The core of the invention therefore lies in the fact that the base side or the base area of the protective cap according to the invention is approximately ring-shaped and can be placed over the tool shank in any arbitrary rotational position. As the cap is pushed on further, there is an automatic centering of the protective cap by means of connecting surfaces that are located on the interior of the protective cap and correspond approximately to the trochoidal shape of the polygonal tool shank. The base-side ring-shaped surface accordingly transitions into a cover-side trochoidal surface of the protective cap.

In this manner there is an optimum protective action, because now the top cover surface of the protective cap is ideally matched to the trochoidal shape of the tool shank and can no longer be unintentionally rotated or displaced.

In a first embodiment of the invention, the elastic protective cap sits on the polygonal tool shank only by means of a press fit.

In one development of this idea, in addition to the press fit there is also a locking connection between the elastic protective cap and the tool shank, wherein in one preferred embodiment, this locking connection occurs on the base side of the protective cap toward the base side on the trochoidal shank.

In the vicinity of the base side of this trochoidal shank there is an annular groove with a reduced diameter in which one or more associated locking lugs that project on the base side radially into the interior of the protective can be engaged.

Consequently, in addition to the press fit, according to this additional object of the invention, a locked fit of the protective cap is also achieved.

In one preferred configuration of the invention, the cylindrical casing surface of the protective cap is not exactly ring-shaped, so that the term "annular" or "ring-shaped surface" is meant only to the extent that in the vicinity of this annular surface there are wedge-shaped surfaces that taper conically in the direction of insertion, the shape of which matches the associated trochoidal surfaces that run with a flat radius of curvature.

At intervals along the periphery and uniformly distributed in relation to the above mentioned wedge-shaped surfaces on the inside of the receptacle opening of the cylindrical casing in the vicinity of the cover surface there are inside centering lugs that also have a smaller diameter and project into the interior of the receptacle space of the protective cap on the cover side, and are clamped against the transitional surfaces between the flatter trochoidal surfaces.

In this particular configuration, the centering lugs assume a uniform distance from one another, and between them form a centering surface that sits exactly on the transitional surface that has a reduced radius of curvature.

Thus the two centering lugs that assume a mutual peripheral distance from one other are in contact to the left and right with the transitional surface that has a larger radius of curvature in the vicinity of the trochoidal shape, as a result of which the centering surface between them is centered exactly on this transitional surface, and therefore the protective cap is effectively protected from rotating out of position on the polygonal tool shank.

In one preferred embodiment of the invention, the wedge-shaped surfaces are each distributed uniformly at a peripheral interval of 120 degrees over the periphery of the protective cap on the inside, starting from the base side and extending upward, while the centering lugs are located in between them, and are also uniformly distributed at an angular interval of 120 degrees on the periphery, so that there is a peripheral angular distance of 60 degrees between the centering lugs located on the cover side.

A protective cap of the type described above with the features cited above is suitable for automatic placement on polygonal tool shanks of this type. A protective cap of this type can be put in place by a robot because there is always an automatic centering of the rotational position of the protective cap for the polygonal tool shank. The invention does not require a test to see how the clamping surface adheres to the transitional surface having a larger radius of curvature in the trochoidal area. Therefore the protective caps of the prior art were not suitable for machine-assisted assembly.

The object of this invention is not only as described with reference to the subject matter of the individual claims, but also results from the combination of the individual claims with one another.

All the information and features disclosed in the documents, including in the abstract of the invention, and in particular the three-dimensional configuration illustrated in the drawings, are claimed as essential to the invention to the extent that they are novel, individually or in combination, with respect to the prior art.

The invention is explained in greater detail below on the basis of only one approach to an embodiment, which is illustrated in the accompanying drawings. Additional features and advantages that are essential to the invention are illustrated in the drawings and explained in the accompanying description, in which:

FIG. 1: view in perspective of the protective cap from the base side

Figure 2:
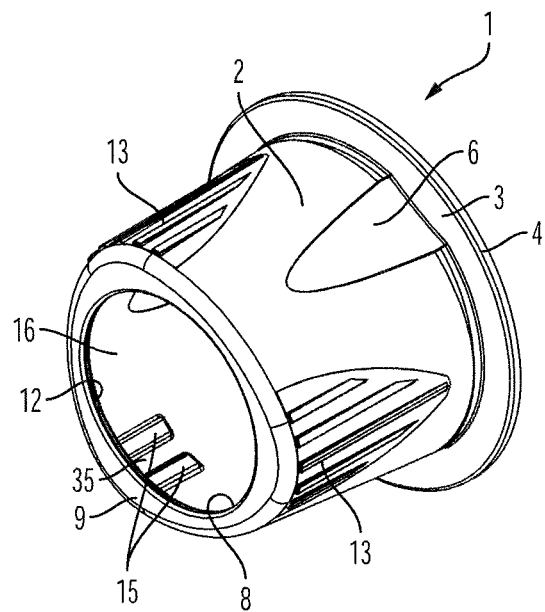

FIG. 2: view in perspective of the protective cap from the cover side

Figure 3:
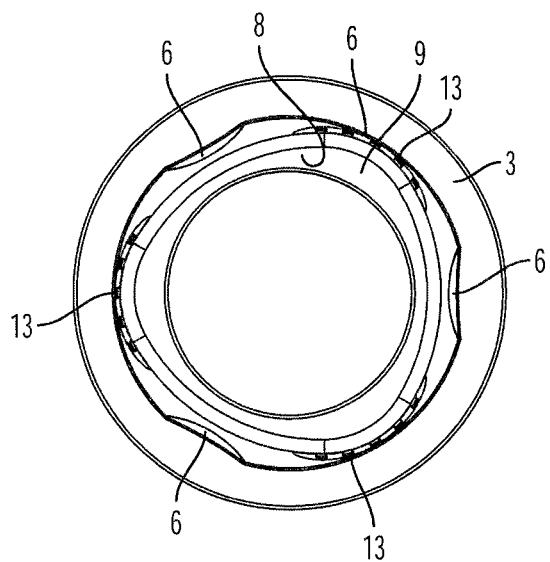

FIG. 3: the view according to FIG. 2 from the cover side

Figure 4:
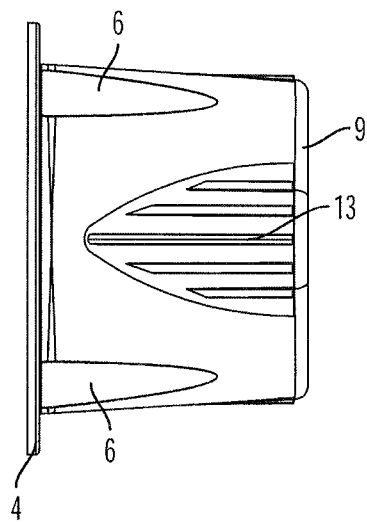

FIG. 4: the side view of the protective cap

Figure 5:
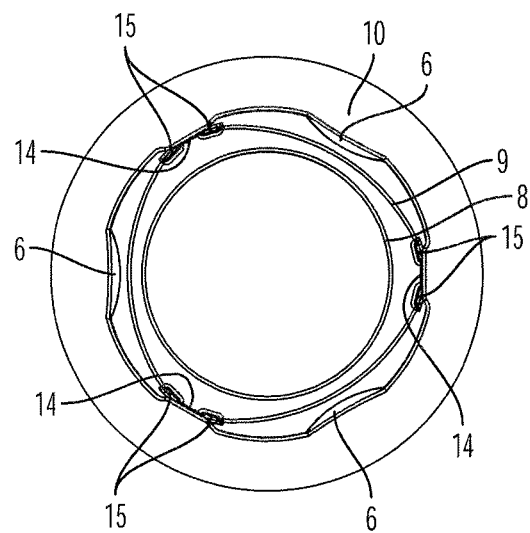

FIG. 5: the bottom view of the protective cap illustrated in FIG. 1

Figure 6:
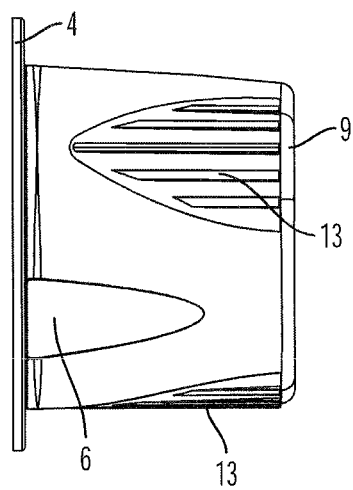

FIG. 6: an illustration identical to the one in FIG. 4 except rotated

Figure 7:
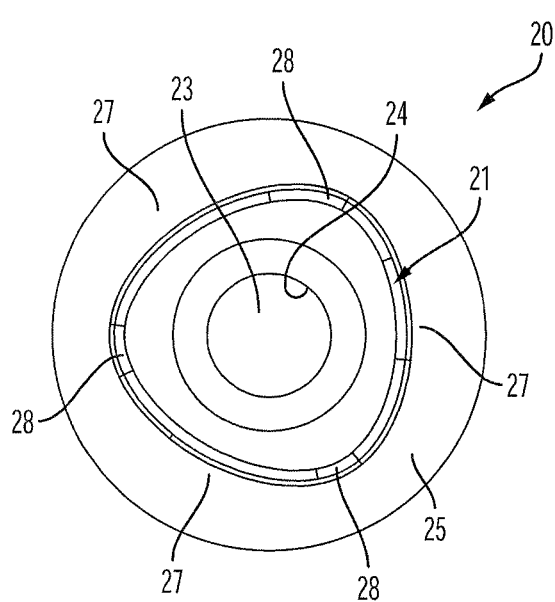

FIG. 7: a head-on view of a tool holder

Figure 8:
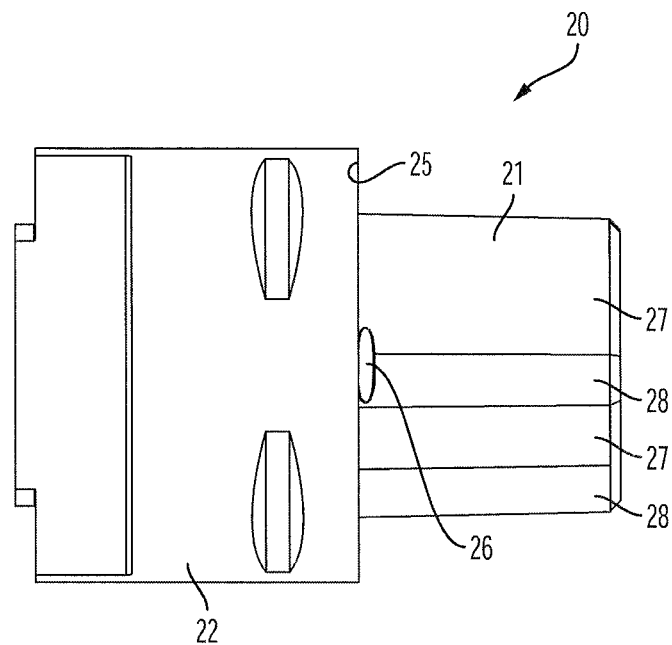

FIG. 8: the side view of the tool holder

Figure 9:
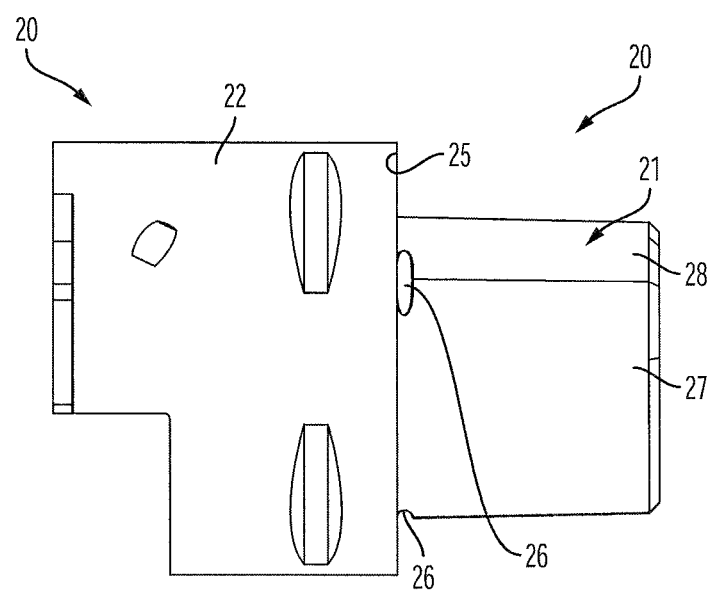
Figure 10:
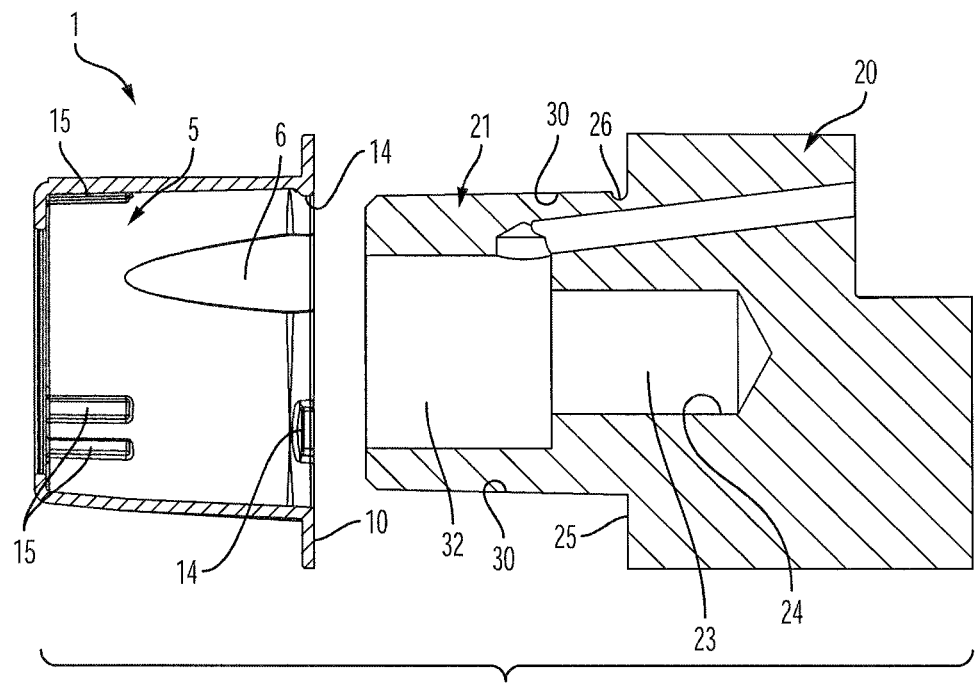
Figure 11:
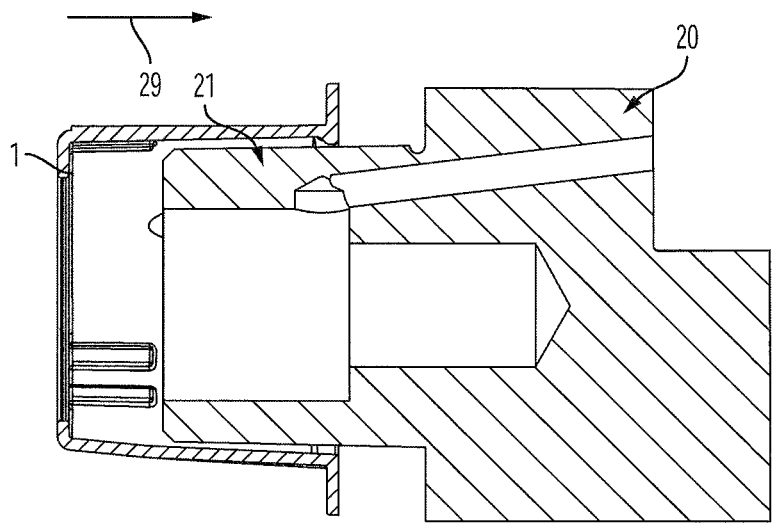

FIG. 9: the side view of the tool holder illustrated in FIG. 8 rotated by 90 degrees FIG. 10: an assembly drawing illustrating the placement of the protective cap on the polygonal tool shank of the tool holder FIG. 11: the further advance of the slipping on of the cap in comparison to FIG. 10

Figure 12:
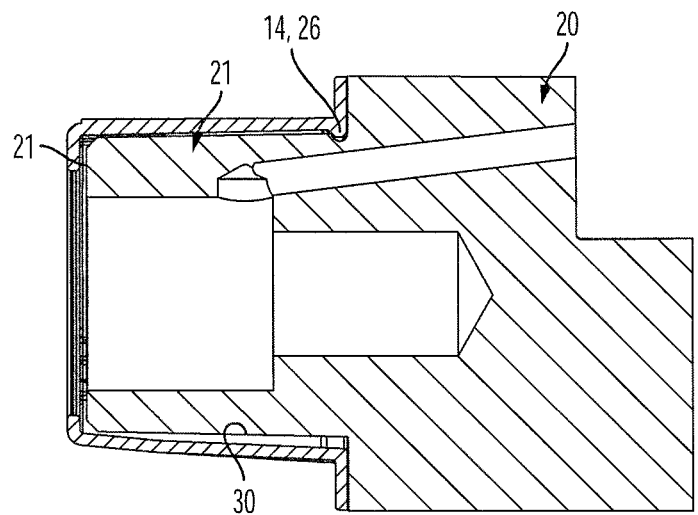
Figure 13:
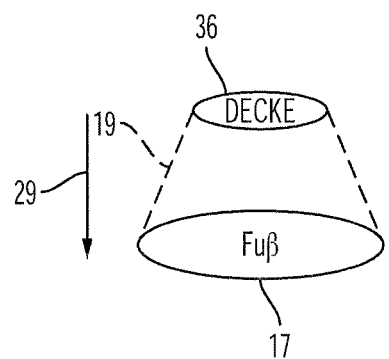
Figure 14:
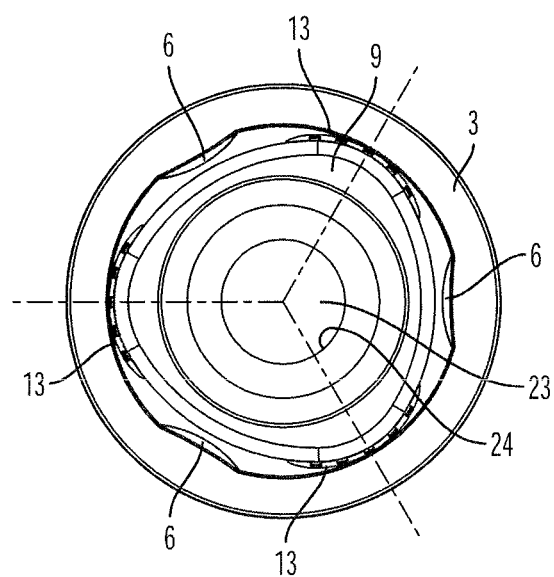
Figure 15:
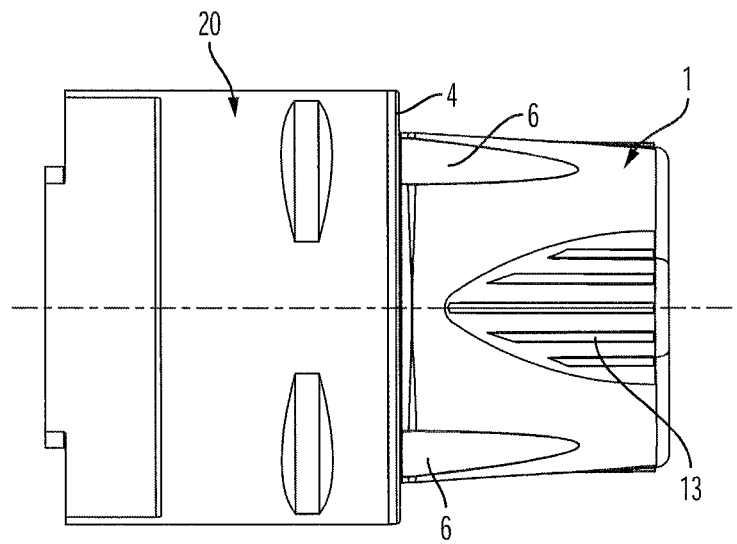
Figure 16:
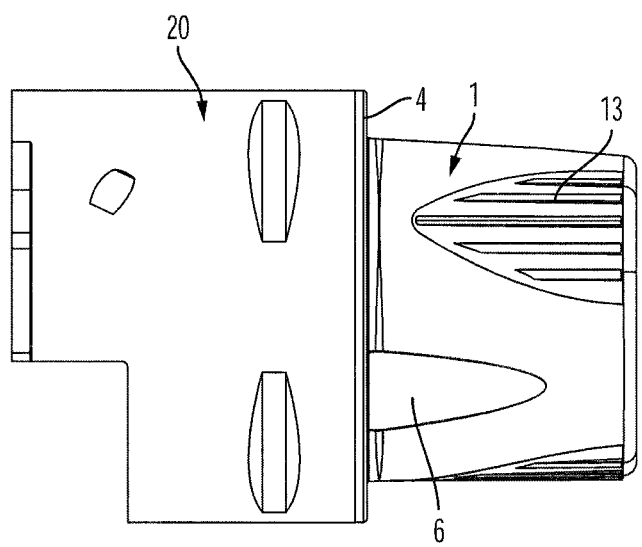
Figure 17:
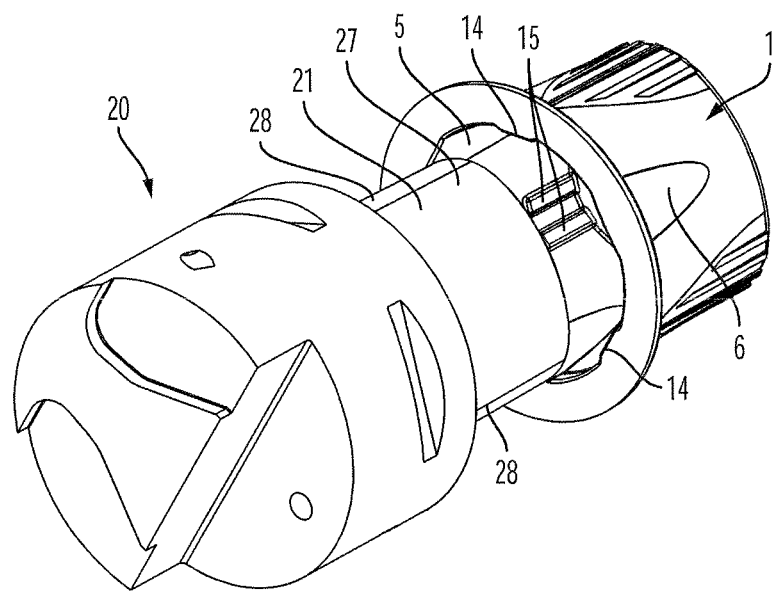
Figure 18:
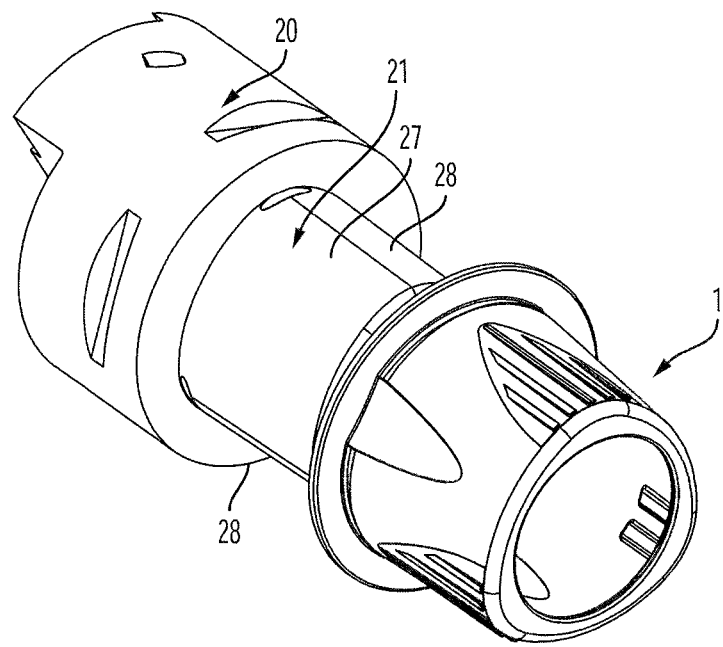
Figure 19:
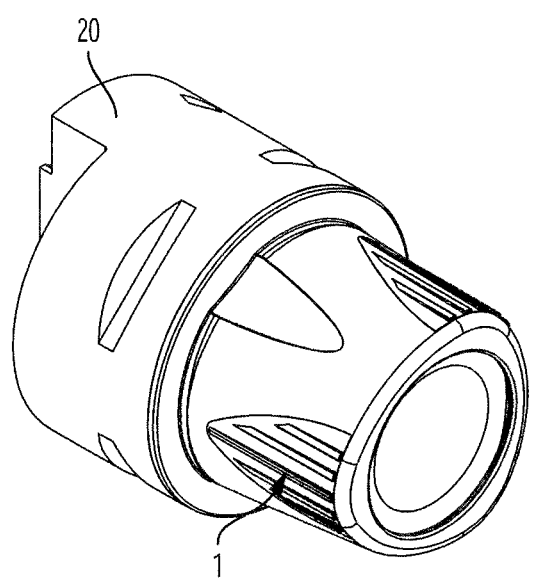

FIG. 12: the full protective position of the protective cap covering the polygonal took shank FIG. 13: a schematic illustration of the basic shape of the elastic protective cap according to the invention FIG. 14: the end view of the system illustrated in FIG. 15 with the protective cap in place FIG. 15: the side view of the system with the protective cap in place FIG. 16: the side view from FIG. 15 rotated by 90 degrees FIG. 17: a view in perspective as the protective cap placed on the polygonal tool shank FIG. 18: the position illustrated in FIG. 17 rotated by 90 degrees FIG. 19: the protective cap placed completely over the polygonal tool shank The protective cap 1 illustrated in FIGS. 1 to 6 is made essentially of an elastically deformable plastic, such as a propylene or similar material, for example.

The important thing is that the material of the protective cap is thin-walled to make possible a certain minor elastic expansion of the protective cap.

As illustrated in the exemplary embodiment in FIGS. 1 to 6, the protective cap consists of an annular cylindrical casing 2 which, however, according to the general description, is not in the form of a ring-shaped profile, but has a special slip-on profile which will be discussed in greater detail below.

On the bottom end of the cylindrical casing 2, on the base side, is a terminating ring 3 that is approximately ring-shaped and also forms a likewise ring-shaped encircling end surface 4.

The cylindrical casing 2 is then formed on the terminating ring 3, wherein the shape of the cylindrical casing is generally the shape illustrated in FIG. 13. In the figure, the base side of the protective cap 1, i.e. the area around the terminating ring 3, is in the shape of a ring 17, and the transitional surfaces 19 that start at the ring 17 and are adapted in the vicinity of the cover surface 36 to the trochoidal shape of the trochoidal shank 21 which is described below.

In FIG. 2, the cylindrical casing 2 is first provided on its base side with wedge-shaped areas 6 that expand upward, whereby preferably three wedge-shaped areas 6 are uniformly distributed on the periphery, wherein the wedge-shaped areas 6 project from the outside radially inward into the receptacle space 5, and therefore reduce the clear width of the receptacle space 5 at the points where the wedge-shaped areas 6 are located.

Between the wedge-shaped areas 6, curved surfaces 7 are located in the receptacle space 5 that have a larger radius of curvature than the adjacent wedge-shaped areas 6.

The curved surfaces 7 are used for the shape-adapted contact against the trochoidal surfaces 27 of the trochoidal shank 21, as illustrated in FIGS. 7 to 9, while the wedge-shaped areas 6 that have a larger radius of curvature are designed to be in contact with the transitional surfaces 28 that have a greater radius of curvature of the trochoidal shank 21.

The cylindrical casing 2 which is adapted to the trochoidal shape, is open on top and does not have a cover.

The invention is not restricted to this embodiment. A cover surface can be provided, in other words, the protective cap 1 can be closed in the vicinity of the upper annular surface 8.

In the open embodiment illustrated here, one can see through the cover-side opening 16 and see the inwardly projecting centering lugs 15 located in the vicinity of the top cover side, which lugs assume a specified distance from one another and between which centering surfaces 35 are formed.

On the external periphery, the cylindrical casing 2 is provided with gripping surfaces 13 that are used only to facilitate handling and otherwise have no additional function. At this point it is important that the cover surface 36 (see FIG. 13) is in the form of a trochoidal surface 9, the shape of which corresponds to the trochoidal shape 18 of the trochoidal shank 21.

Therefore the cap-side trochoidal surface 9 has a shape that is adapted to allow it to rest against the shank-side trochoidal surfaces 27 and therefore optimally protects the latter surfaces against damage.

It should be noted that the base-side terminating ring 3 forms a base-side annular surface 10, and the lower insertion-guide profile 11 is approximately ring-shaped, while the upper slip-on profile which is formed in the vicinity of the trochoidal surface 9 on the cover side has a trochoidal shape.

The adaptation profile 12 located on the cover side is therefore adapted in terms of shape to the trochoidal shape 18 of the trochoidal shank 21.

In and of itself, a press fit of this type would suffice to guarantee an automatic centering of the protective cap 1 on a trochoidal shank, as illustrated in FIGS. 7 to 9.

In the figures, the tool holder 20 consists of a coupling part 22 which continues forward in the form of a trochoidal shank 21, which consists essentially of 3 trochoidal surfaces 27 with a given, reduced radius of curvature uniformly offset from one another, between which are transitional surfaces 28 with a larger, or greater radius of curvature.

This trochoidal shank 21 is to be covered with a matching shape by the protective cap 1 claimed by the invention, and is to be protected by a press fit so that the protective cap 1 is automatically centered when it is slipped onto the trochoidal shank 21.

This automatic centering is achieved in that, when the approximately ring-shaped insertion-guide profile 11 on the base side of the protective cap is initially placed over the trochoidal shank 21, the trochoidal surfaces 27 with the transitional surfaces 28 in between them run along the wedge-shaped areas 6 that project radially inward and in a cone shape in the axial direction, so that the wedge-shaped areas slide along the trochoidal surfaces 27 and are thus automatically, angularly centered on the trochoidal surfaces 27 of the trochoidal shank 21.

To then achieve a final centering, the invention further provides that on the cover side 36 there are additional centering lugs 15 distributed uniformly around the periphery with centering surfaces 35 formed between them, which extend beyond the transitional surfaces 28 between the trochoidal surfaces 27, and thus guarantee a form-fitting centering of the protective cap 1 on the trochoidal shank 21.

A press fit of this type, in and of itself, would already suffice.

In one development of the invention, however, the invention teaches that on the base side, in the vicinity of the terminating ring 3, locking lugs 14 that project radially inward are provided on the inside and are engaged in at least one partial recess 26 at the base of the trochoidal shank 21, as illustrated in FIGS. 10 to 12.

In this manner, there is an elastic locking of the base side of the protective cap 1 at the base of the trochoidal shank 21, so that the terminating ring 3 is in contact with the stop surface 25 on the coupling part 22.

In addition, the trochoidal shank 21 has an annular space 32 that continues in the axial direction into a screw receptacle 23 with a female thread 24 located there.

FIG. 10 shows that the trochoidal shank 21 is shaped in the axial direction in the form of a slightly conical surface 30, and the cylindrical casing 2 of the print tech tips cap 1 is accordingly slightly conical in the direction in which it is placed over the shank (arrow 29).

The locking of the protective cap illustrated in FIG. 12 is selected so that on the inner cover surface of the protective cap 1, there is a recess 31 toward the front end surface of the trochoidal shank 21 is formed. In this manner it is always guaranteed that the protective cap 1 can be locked in a secured position on the trochoidal shank.

FIGS. 14 to 19 illustrate the various motions executed by the protective cap 1 when it is placed over the trochoidal shank 21, whereby in particular during the transition from FIG. 17 to FIG. 18 it is apparent that if it is placed on in incorrect position, if, for example, the wedge-shaped areas 6 are in the vicinity of the transitional surfaces 28 that have a smaller radius of curvature, the wedge-shaped areas 6 are automatically angularly rotated away from these transitional surfaces 28 and therefore the protective cap 1 is automatically rotated into the proper position illustrated in 17.

Therefore an automatic placement of the protective cap is easily possible and requires no trial-and-error checking, as with the protective caps described in the prior art.

NOMENCLATURE

1 Protective cap
2 Cylindrical casing
3 Terminating ring
4 End surface
5 Receptacle space
6 Wedge-shaped area
7 Curved surface
8 Ring-shaped surface (top)
9 Trochoidal surface
10 Ring-shaped surface (bottom)
11 Introduction profile (bottom)
12 Adaptation profile
13 Gripper surface
14 Locking lug (bottom)
15 Centering lug (top)
16 Opening
17 Ring-shape
18 Trochoidal shape
19 Transitional area
20 Tool holder 21 Trochoidal shank
22 Coupling part
23 Screw receptacle
24 Female thread
25 Stop surface
26 Recess
27 Trochoidal surface
28 Transitional area
29 Arrow
30 Conical surface
31 Recess
32 Annulus
33
34
35 Centering surface
36 Cover surface

The invention claimed is:

1. A protective cap for covering a tool shank that has a polygonal shape, said protective cap comprising:
   a casing that is at least partly cylindrically-shaped, said casing having a base end and an opposite end that is oppositely disposed on said casing from said base end; and
   a terminating ring that is connected to said casing adjacent the base end of said casing, said terminating ring defining a ring-shaped insertion-guide profile, said casing and said terminating ring cooperating to define a receptacle space for the tool shank, said casing transitioning from an annular surface at the base end to a trochoidal surface at said opposite end, said trochoidal surface corresponding to the shape of said tool shank.

2. The protective cap of claim 1 wherein said tool shank has a base with a trochoidal shape, said protective cap having a trochoidal surface with a shape that corresponds to the trochoidal shape of the tool shank.

3. The protective cap of claim 1 wherein said casing defines an inner surface that includes at least one wedge-shaped area that projects radially inwardly into said receptacle space to reduce the width between opposite sides of the receptacle space.

4. The protective cap of claim 2 wherein said tool shank defines transitional surfaces, the cover surface of said protective cap including centering lugs that project radially inwardly to define centering surfaces between said centering lugs, said centering surfaces interacting with said transitional surfaces of said tool shank.

5. The protective cap of claim 1 wherein said protective cap is press fitted on said tool shank.

6. The protective cap of claim 3 wherein the at least one wedge-shaped area includes at least two wedge shaped areas; and wherein at least one curved surface is located in the receptacle space between the wedge-shaped areas, said at least one curved surface having a radius of curvature that is greater than a radius of said wedge-shaped areas.

7. The protective cap of claim 1 wherein said tool shank includes at least one recess, said protective cap including at least one locking lug that is located adjacent said terminating ring, said locking lug engaging said at least one recess on the tool shank to form a locking connection between said protective cap and said tool shank.

8. The protective cap of claim 4, wherein wedge-shaped surfaces are regularly distributed on the inside of the periphery of said protective cap at intervals of 120 degrees, said centering lugs being located between said wedge-shaped surfaces and distributed at angular intervals of 120 degrees so that there is a peripheral angular separation of 60 degrees between said centering lugs and said wedge-shaped surfaces.

9. The protective cap of claim 3 wherein the at least one wedge-shaped area corresponds to the trochoidal shape of the tool shank.

* * * * *